United States Patent [19]
Arvidsson

[11] Patent Number: 5,383,551
[45] Date of Patent: Jan. 24, 1995

[54] DEVICE FOR A BURNER PREFERABLY FOR A SPIRIT STOVE

[75] Inventor: Thomas Arvidsson, Ljungby, Sweden

[73] Assignee: Aktiebolaget Electrolux, Sweden

[21] Appl. No.: 173,760

[22] Filed: Dec. 27, 1993

[30] Foreign Application Priority Data

Dec. 29, 1992 [SE] Sweden .................. 9203924

[51] Int. Cl.⁶ .................................. F24C 5/00
[52] U.S. Cl. .............................. 126/43; 431/320
[58] Field of Search ............... 126/43; 431/320

[56] References Cited

U.S. PATENT DOCUMENTS

| | | |
|---|---|---|
| 1,268,013 | 5/1918 | Kelley . |
| 1,517,356 | 12/1924 | Goldberg et al. . |
| 4,895,132 | 1/1990 | Boij .................. 126/43 |
| 4,984,559 | 1/1991 | Bennet ............... 126/43 |
| 5,273,023 | 12/1993 | Ebbeson ............. 126/43 |

FOREIGN PATENT DOCUMENTS

8200332  2/1982  WIPO .

*Primary Examiner*—Carroll B. Dority
*Attorney, Agent, or Firm*—Pearne, Gordon, McCoy & Granger

[57] ABSTRACT

The present invention provides a device for a burner for a non-pressurized spirit stove. The stove includes a fuel container (10) with a spirit-absorbing means. The container provides an opening (11) in which the absorbing mass is uncovered in order to form an evaporation surface for the spirit-type fuel. The stove further includes a flame spreader (15) which is placed above the opening and which comprises a generally horizontal plate (16) with a downwardly extending edge part (17) through which air during burning flows to the evaporation surface. The plate (16) has several openings (22) which are shaped such that several minor flames are created having horizontal and tangential direction components.

9 Claims, 2 Drawing Sheets

DEVICE FOR A BURNER PREFERABLY FOR A SPIRIT STOVE

BACKGROUND OF THE INVENTION

Spirit stoves are usually provided with a holder for cooking-utensils and a flame spreader beneath the cooking utensil holder which divides a flame into several minor flames, thereby reducing the extension of the height of the flame to provide more complete spirit combustion and, to some extent, to reduce the likelihood of soot deposits on the cooking-utensils. U.S. Pat. No. 4,984,559 is exemplary of these types of spirit stoves.

Even if the combustion efficiency is acceptable in these stoves, there is a desire to achieve a more complete combustion in order to reduce the CO-content in the combustion gases. Therefore, there is a need in the art for spirit stoves with increased combustion efficiency.

SUMMARY OF THE INVENTION

The present invention includes a device for an unpressurized spirit stove burner which has a fuel container with a spirit-absorbing mass. The container includes an opening to reveal or uncover a portion of the spirit-absorbing mass which forms an evaporation surface for the spirit. The stove burner includes a flame spreader which is placed above the opening and which comprises a mainly horizontal plate and a downwardly extending tube-shaped part below which air during combustion flows to the evaporation surface.

In accordance with the present invention, the horizontal plate has several flame openings formed therein which are arranged to create several minor flames having tangential and horizontal components. The openings are defined by a first part of the plate which is downwardly bent relative to the plate and a second part of the plate which is upwardly bent relative to the plate. The first and second parts cooperate to create upwardly slanting channels for the minor flames.

In further accordance with the present invention, the resulting minor flames have a non-circular cross section which reduces the distance oxygen must travel to reach the center of the flame and thereby reduces CO in the combustion gases. The minor flames have a horizontally directed component which increases the length of the flame while not increasing the height of the stove.

BRIEF DESCRIPTION OF THE DRAWINGS

These and further features of the invention will now be described with reference to the accompanying drawings, wherein.

DETAILED DESCRIPTION OF THE PREFERRED EMBODIMENT

Figure 1:
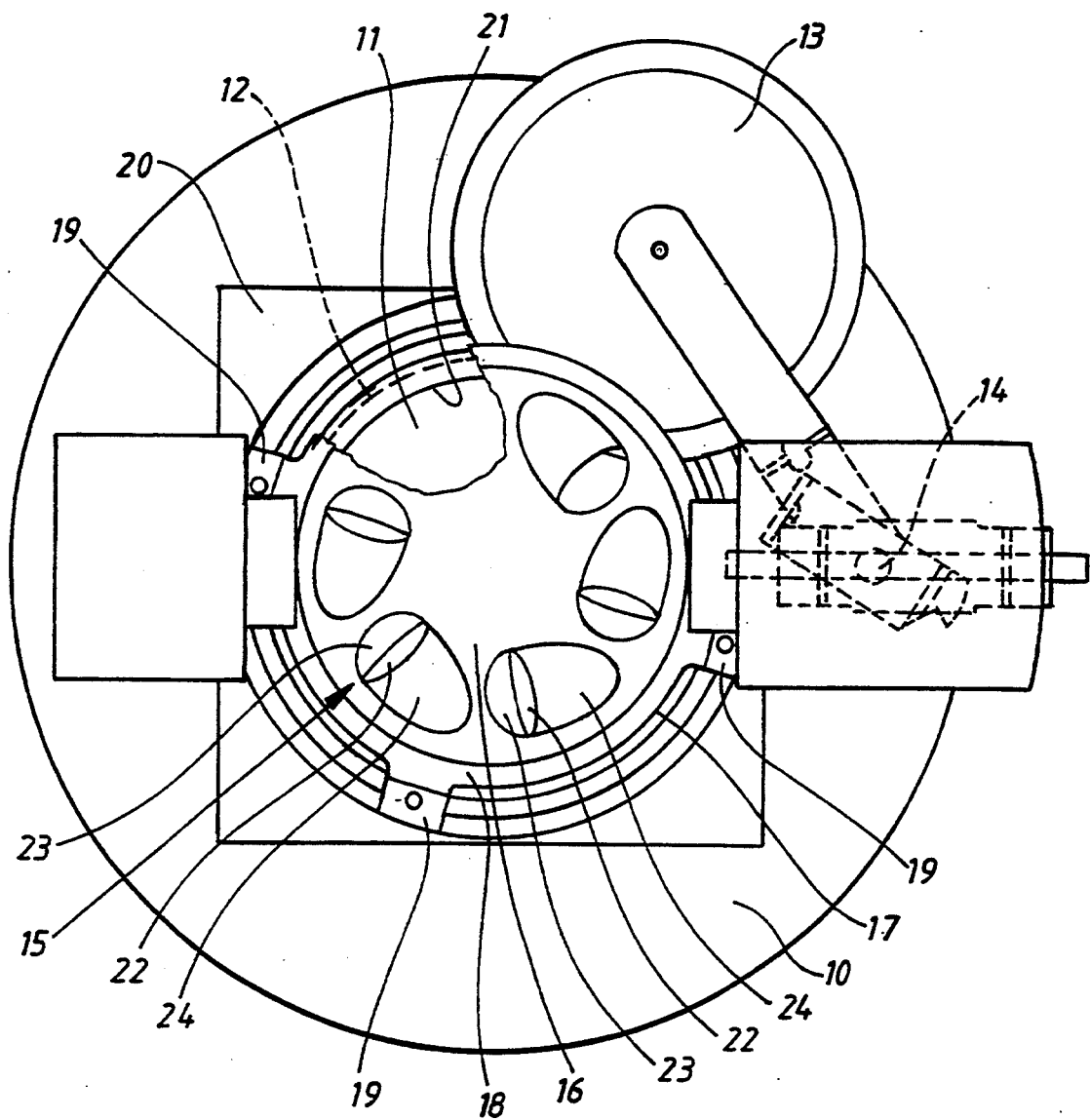
FIG. 1 is an elevational view, with portions broken away, of a spirit stove with a device in accordance with the present invention; and, FIG. 2 is a side elevational view of the device in accordance with the present invention.
Figure 2:
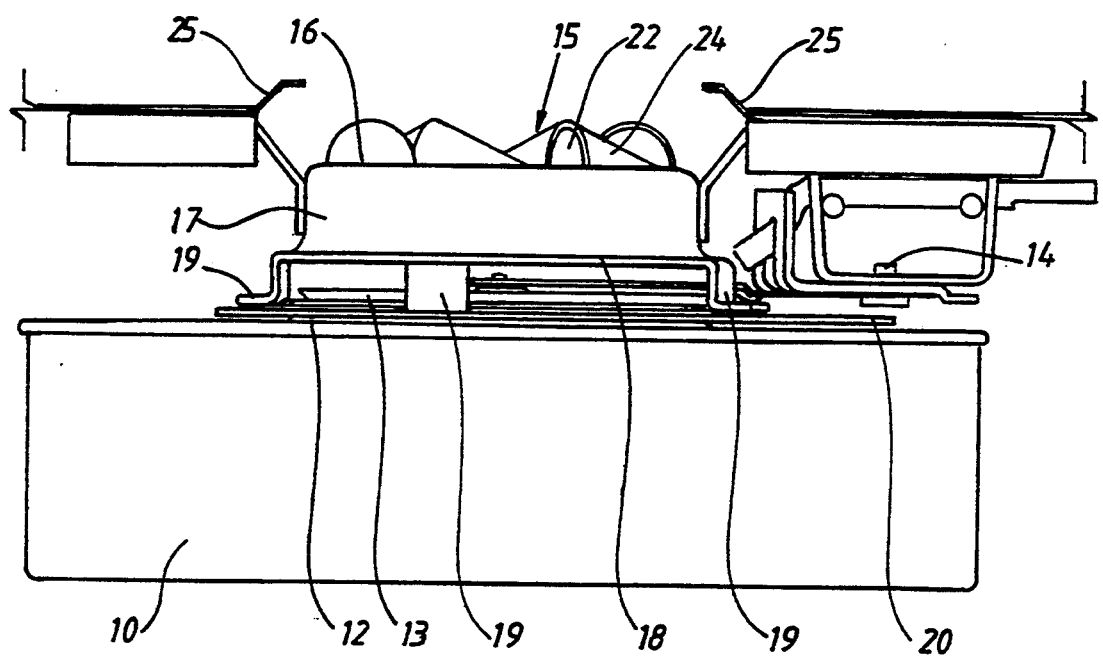

In the drawing FIGS. 10 indicates a circular container which contains a mass for absorbing spirit-type fuel. At the top of the container 10 there is a central circular opening 11 surrounded by a raised bead 12. In the opening 11 a portion of the absorbing mass is uncovered or revealed and serves as a vaporizing or evaporation surface for the spirit fuel which can be ignited and burned in this opening. The opening 11 is adjustably covered varying amounts, as desired, by a disc 13 in order to adjust the flame height or to extinguish the flame. The disc 13 is in a manner which is not described in detail turnably or pivotally supported on a vertical shaft 14.

Above the opening 11 there is a flame spreader 15 comprising an upper generally horizontal plate 16 continuing into a tube-like or cylinder shaped, downwardly extending part 17. The lower end of the downwardly extending part 17 has an outwardly extending flange 18 which is above and spaced a distance from the container 10 so that air can flow under the flange 18 toward the opening 11 and the flame. The flame spreader 15 is supported above the container 10 by means of several distance means 19 which are fixed to a plate 20. In the preferred embodiment the distance means 19 comprise a series of downwardly extending legs, as illustrated. The plate 20 has a central opening 21 which is coaxial with the opening 11, as illustrated, and is supported by the bead 12 which surrounds the opening 11 (FIG. 1).

The upper horizontal plate 16 of the flame spreader has several oval openings 22 which are placed along the periphery of a circle. These openings 22 are formed by giving a first part 23 of the plate a curvatured, downwardly bent form whereas a second part 24 is given an upwardly bent, curved form. Thus, several upwardly inclined channels are formed by the first and second parts 23, 24, and these channels create several minor flames which have a horizontal and a tangential direction component.

The flame spreader 15 also supports, in a conventional way, a holder 25, not shown in detail, for cooking-utensils such as pots or pans.

By means of the above-mentioned construction an arrangement is created which effectively mixes or introduces the air into the burning area thereby radically reducing the content of carbon monoxide in the combustion gases. Thus, experimental work has shown that the CO-content can be reduced up to 90% compared to conventional arrangements.

According to the present invention, combustion takes place in several minor flames and the minor flames are separated in such a way that oxygen can be supplied to the flames from all directions. At the same time, the minor flames are so close to each other that this criteria (i.e., supplying oxygen to all sides of the flame) is only just fulfilled. Thus, the minor flames maintain their heat content during the combustion reaction which has a positive influence on the reduction of combustion gas emissions.

In order to get a more complete combustion the diffusion length, i.e. the distance which the surrounding oxygen has to flow in order to reach the center of each minor flame, should be minimized. This is achieved in the present invention by using a non-circular cross section of the minor flames created. Thus, according to the present invention the flames preferably have an oval cross section in which the diffusion length is about half as compared to the diffusion length of flames having a circular cross section. The number of minor flames can, of course, be varied in an suitable way in order to achieve spirit stoves with any desired power and height.

Stay time also plays an important role during the combustion process. It is necessary to give the flames a maximum of combustion time before cooling takes place, which means that it is desirable to provide for a long distance between the cooking utensils and the burner. It is at the same time important to minimize the height of the spirit stove. In order to solve this contradiction, the burner according to the present invention is designed such that the flames achieve a horizontally-directed component which extends the distance between the flames and cooking utensils and, hence, the stay time for each minor flame while the height of the stove is minimized or at least not extended. According to a contemplated modification of the preferred and illustrated embodiment of the present invention, the minor flames could have a spiral shaped track which would thereby extend the distance between the burner and the cooking utensils without increasing the stove height.

It should be mentioned that the flame spreader shall be so shaped that what has been said above is fulfilled without giving the flame spreader a heat capacity which is unnecessary large wherein, when a spirit stove is ignited, a large amount of carbon monoxide instead of carbon dioxide is created under an initial stage because the flame is cooled by the adjacent cold surfaces. By using a flame spreader with a small heat capacity this initial stage or period is shortened.

What is claimed is:

1. Device for a spirit stove burner which operates without pressure comprising, a fuel container (10) with a spirit-absorbing mass, the container having an opening (11) in which a portion of the absorbing mass is revealed in order to form an evaporation surface for the spirit, the stove having a flame spreader (15) which is placed above the opening and which comprises a generally horizontal plate (16) defining an upper side and a downwardly extending tube shaped part (17) below which air during burning flows to the evaporation surface, wherein the plate (16) has several flame openings (22) which are arranged and operable to create several minor flames which have a horizontal and a tangential direction component.

2. Device according to claim 1 wherein the openings (22) are shaped such that the minor flames have a tangential direction component when viewed from above.

3. Device according to claim 1 wherein the openings (22) are arranged and operable to direct the minor flames obliquely upwards from the flame spreader (15).

4. Device according to claim 1 wherein each opening is limited by a first part (23) which is bent downwardly with respect to the upper side (16) of the flame spreader and a second part (24) which is bent upwardly with respect to the upper side (16) of the flame spreader thereby creating upwardly-slanting channels for the minor flames.

5. Device according to claim 4 wherein the plate is circular and the tube-shaped part (17) is a downwardly directed cylinder.

6. Device according to claim 5 wherein the lower end of the tube-shaped part (17) is located above and at a distance from the evaporation surface.

7. Device according to claim 4 wherein the openings (22) are shaped such that the resulting minor flames have a non-circular cross section.

8. Device according to claim 7 wherein the openings (22) are shaped such that the resulting minor flames have an oval cross section.

9. Device according to claim 8 wherein the openings (22) are shaped such that the resulting minor flames are separated from each other but in close proximity of each other.

* * * * *